(12) United States Patent
Lin (10) Patent No.: US 7,028,799 B2
(45) Date of Patent: Apr. 18, 2006

(54) STRUCTURE OF A FRAME OF AN ELECTRIC CART FOR A PERSON TO RIDE ON

(75) Inventor: Samuel Lin, Chia Yi (TW)

(73) Assignee: Sunpex Technology Co., Ltd., Chia Yi (TW)

( * ) Notice: Subject to any disclaimer, the term of this patent is extended or adjusted under 35 U.S.C. 154(b) by 199 days.

(21) Appl. No.: 10/822,745

(22) Filed: Apr. 13, 2004

(65) Prior Publication Data
US 2005/0224275 A1   Oct. 13, 2005

(51) Int. Cl.
*B62D 21/00*   (2006.01)

(52) U.S. Cl. .................. 180/208; 180/908; 180/65.1; 180/311

(58) Field of Classification Search ............... 280/781, 280/124.113, 124.111, 124.177; 180/208, 180/908, 65.1, 311
See application file for complete search history.

(56) References Cited

U.S. PATENT DOCUMENTS

| | | | |
|---|---|---|---|
| 6,439,331 B1 * | 8/2002 | Fan | 180/208 |
| 6,565,105 B1 * | 5/2003 | Lin | 280/124.113 |
| 6,655,717 B1 * | 12/2003 | Wang | 280/781 |
| 6,712,369 B1 * | 3/2004 | Wu | 280/5.2 |

* cited by examiner

*Primary Examiner*—Christopher P. Ellis
*Assistant Examiner*—Cynthia F. Collado
(74) *Attorney, Agent, or Firm*—Rosenberg, Klein & Lee (57) ABSTRACT

A frame of an electric cart includes a front part, and a rear part separable from the front part; the front part has a locating member secured on a rear end thereof; the rear part has a connecting member secured on a front end thereof for engaging the locating member, which connecting member has a spring-loaded engaging pin passed through it; the pin is made such as to be capable of engaging the locating member automatically while the rear part is being moved so as to fit the connecting member onto the locating member, thus securely joining the rear part to the front part; the engaging pin will be disengaged from the fitting portion when it is pressed at a first end, thus allowing the rear part to be separated from the front part.

5 Claims, 7 Drawing Sheets

STRUCTURE OF A FRAME OF AN ELECTRIC CART FOR A PERSON TO RIDE ON

BACKGROUND OF THE INVENTION

1. Field of the Invention

The present invention relates to a frame of an electric cart for a person to ride on, more particularly one including a front part, and a rear part, which can be rapidly separated from the front part for the frame to occupy less space in storage and transportation, and which can be rapidly joined to the front part.

2. Brief Description of the Prior Art

Electric carts are very convenient personal vehicles for physically handicapped people.

Figure 10:
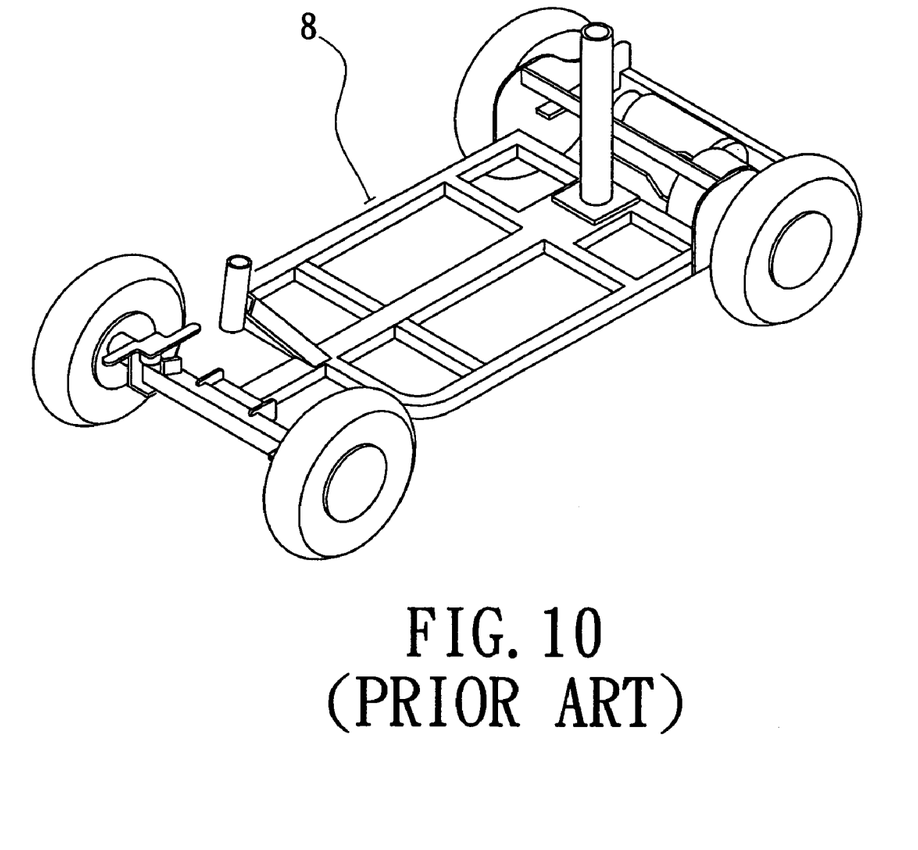
FIG. 10 is a perspective view of the conventional frame of an electric cart as described in Background.

Referring to FIG. 10, a conventional electric cart for a person to ride on includes a frame 8, front and rear wheels fitted to the frame 8, a handle bar, a seat, power and transmission (not shown) fitted on the frame 8. The frame 8 is made of several bars and rods, which are securely connected together by means of welding, therefore the frame can't be separated into several parts. Consequently, the electric cart will occupy much space in storage and transportation.

SUMMARY OF THE INVENTION

It is a main object of the present invention to provide a frame of an electric cart, which consists of a front part, and a rear part capable of being rapidly separated from and joined to the front part.

The front part has a locating member secured on a rear end thereof, which is formed with a fitting portion. The rear part has a connecting member secured on a front end thereof for engaging the locating member of the front part, which connecting member has a spring-loaded engaging pin passed through it. The engaging pin will engage the fitting portion of the locating member automatically while the connecting member is being fitted onto the locating member, thus securely joining the rear part to the front part. And, the engaging pin will be disengaged from the fitting portion when it is pressed at a first end, thus allowing the rear part to be separated from the front part of the frame.

BRIEF DESCRIPTION OF THE DRAWINGS

The present invention will be better understood by referring to the accompanying drawings, wherein.

DETAILED DESCRIPTION OF THE PREFERRED EMBODIMENTS

Referring to FIGS. 1 to 4, a preferred embodiment 1 of a frame of an electric cart for a person to ride on includes a front part 11, and a rear part 12. The front part 11 has a locating seat member 2 secured on a rear end thereof while the rear part 12 has a connecting seat member 5 secured on a front end thereof for separable connection with the locating seat member 2 of the front part 11.

The locating seat member 2 has two spaced co-axial tube portions 24, and a fitting portion, which is formed with a through hole 21, a gap 22 adjacent to an upper portion of the through hole 21, and a slope 23 adjacent to and behind the gap 22; the gap 22 is narrower than the through hole 21. A pivotal rod 4, which has a radial through hole 41, is turnably passed into the co-axial tube portions 24 with the radial hole 41 being located between the co-axial tube portions 24. Furthermore, the locating seat member 2 is equipped with a fastening member 3, which includes a lever 31, a rod-shaped part 32, a pressing block 33, a spring 34, and a nut 35. The lever 31 is formed with a pushing portion 311, and a loosening portion 312 at a front end, and is pivotally connected to an upper end of the rod-shaped portion 32 at the front end. The rod-shaped part 32 is formed with screw threads on a lower end, and is passed through the pressing block 33, the spring 34, the radial through hole 41 of the pivotal rod 4 in sequence from the lower end, and connected to the nut 35 at the threaded lower end thereof. Thus, the fastening member 3 is fitted to the pivotal rod 4, which can turn on the locating seat member 2, while the pressing block 32 is biased towards the front end of the lever 31 by the spring 34. And, when the lever 31 is moved to such a position that the pushing portion 311 thereof contacts the pressing block 33, the pressing block 33 will be moved to a lowermost position. When the lever 31 is moved to such a position that the loosening portion 312 thereof contacts the pressing block 33, the pressing block 33 will be biased upwards and away from the lowermost position by the spring 34.

The connecting seat member 5 has a top portion, two lateral wall portions 51, 52 projecting down from lateral edges of the top portion, and a receiving gap 53 on a front end of the top portion, which wall portions 51, 52 have co-axial through holes (not numbered) thereon. Furthermore, the connecting seat member 5 has an engaging pin 6 passed through the through holes of the wall portions 51 and 52. The engaging pin 6 is formed with a pressed end portion 61 at a first end, a thin portion 66 next to the pressed end portion 61, a cone-shaped portion 67 next to the thin portion 66, a stopped portion 64 next to the cone-shaped portion 67, and an insertion portion 62 at the other end, which is thinner than the stopped portion 64; the stopped portion 64 is wider than the gap 22 of the locating seat member 2, but it is slightly narrower than the through hole 21 of the locating seat member 2 while the thin portion 66 is narrower than the gap 22; the pressed end portion 61 is passed through the wall portion 51 while the insertion portion 62 is passed through a spring 63, and the wall portion 52 in sequence such that the spring 63 will bias the pin 6 in a direction away from the wall portion 52. In addition, a detaining element 65 is secured around an inner end of the pressed end portion 61 for preventing the engaging pin 6 from falling out of the connecting seat member 5; the detaining element 65 can be a ring-shaped one.

In addition, the front part 11 has two extension portions 13 at lateral portions thereof, each of which is formed with a gap 131 at a rear end, while the rear part 12 is formed with two projections 14 on lateral sides thereof; to join the rear part 12 to the front part 11, the projections 14 are first fitted into respective ones of the gaps 131 of the extension portions 13 for the rear part 12 to be positioned in proper position as well as for allowing the rear part 12 to pivot on the rear ends of the extension portions 13.

To connect the rear part 12 to the front part 11, referring to FIGS. 1 to 4, the rod-shaped part 32 of the fastening member 3 is laid down with the loosening portion 312 of the lever 31 facing it, and the rear part 12 is lifted at the front end, and the projections 14 are fitted into respective ones of the gaps 131 of the extension portions 13. Next, the rear part 12 is pivoted on the rear ends of the extension portions 13 such that the connecting seat member 5 is fitted over the locating seat member 2, and such that the engaging pin 6 is pressed against the slope 23 at the cone-shaped portion 67 thereof; during downward movement of the engaging pin 6 together with the seat member 5, the pin 6 will be made to move in such direction as to compress the spring 63 owing to contact of the cone-shaped portion 67 with the slope 23, and in turns, the engaging pin 6 is passed through the gap 22 of the locating seat member 2, and into the through hole 21 from the thin portion 66 thereof. Finally, the engaging pin 6 is moved by the spring 63 such that the stopped portion 64 is through the through hole 21; thus, the engaging pin 6 engages the locating seat member 2, and the connecting seat member 5 is stopped from separating from the locating seat member 2. Then, the fastening member 3 is upwards pivoted, and fitted into the receiving gap 53 of the connecting seat member 5 at the rod-shaped portion 32, and the lever 31 is pivoted to such a position as to press the pressing block 33 against the connecting seat member 5 at the pushing portion 311 thereof; thus, the seat members 2 and 5 are securely connected.

Figure 3:
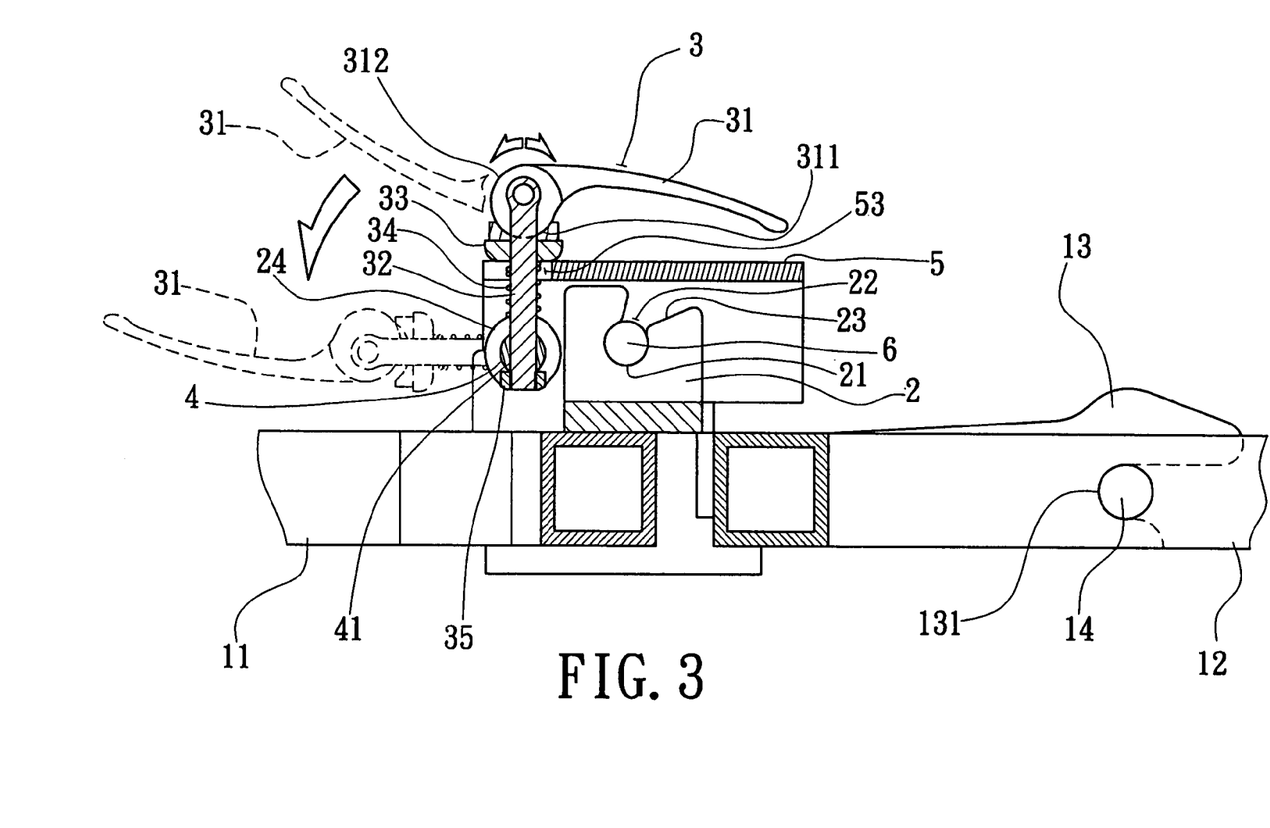
FIG. 3 is a vertical section of the connecting structure of the cart frame of the present invention.
Figure 4:
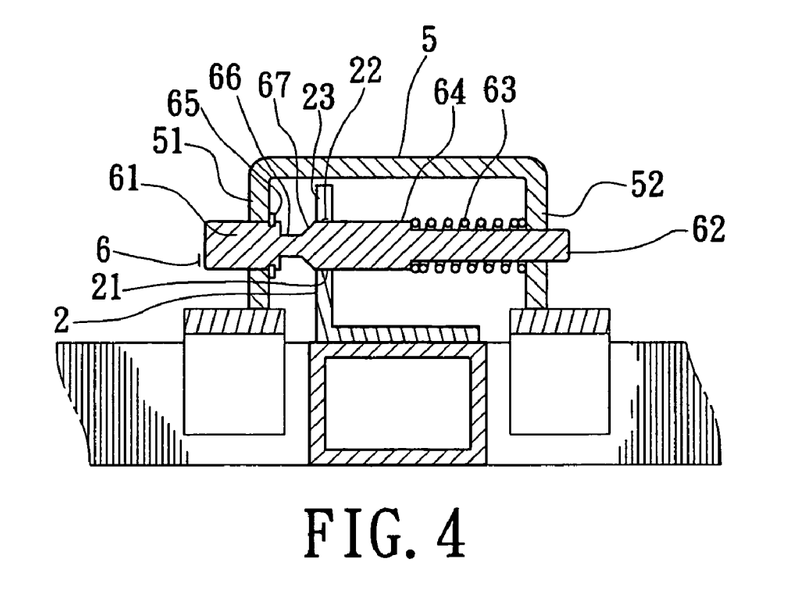
FIG. 4 is another vertical section of the connecting structure of the cart frame of the present invention.
Figure 5:
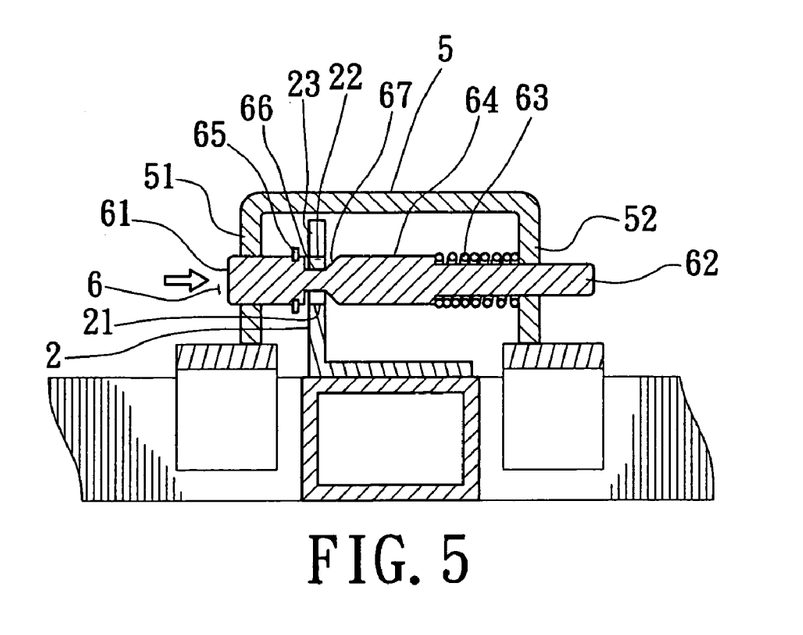
FIG. 5 is a view of the connecting structure of the present frame with the engaging pin being pressed.
Figure 6:
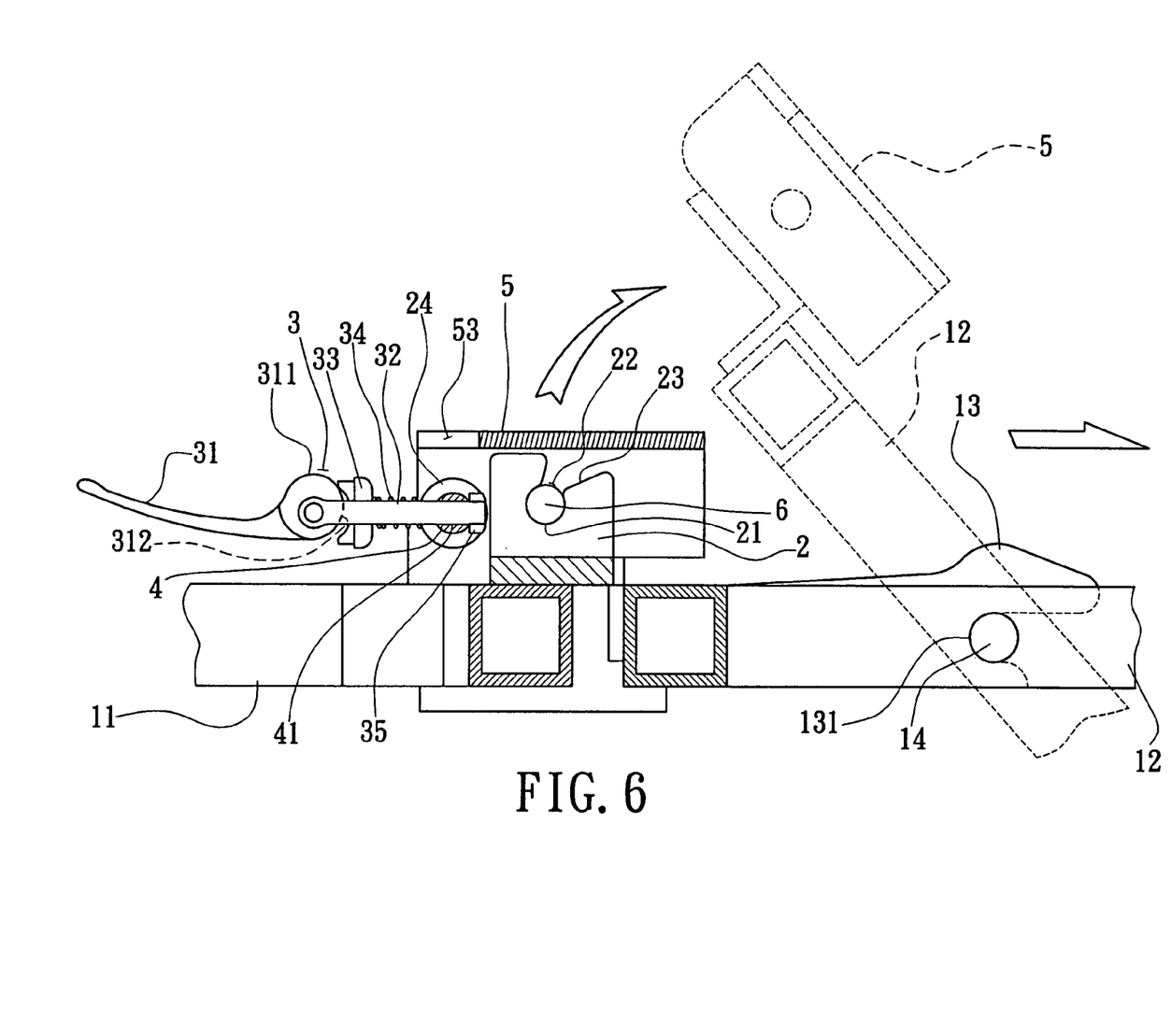
FIG. 6 is a partial side view of the present cart frame under disassembling action.

Referring to FIGS. 3, 5 and 6, to separate the rear part 12 from the front part 11, first the lever 31 is pivoted to such a position as to face the pressing block 33 at the loosening portion 312 thereof, and the rod-shaped portion 32 is moved away from the receiving gap 53 of the connecting seat member 5. Next, the end portion 61 of the engaging pin 6 is pressed such that the stopped portion 64 is away from the through hole 21, and the thin portion 66 is in the through hole 21. Then, the rear part 12 is pivoted on the rear end of the extension portions 13 for the front end thereof to be lifted. Thus, both the engaging pin 6 and the connecting seat member 5 are moved away from the locating seat member 2, and the rear part 12 separated from the front part 11.

Figure 7:
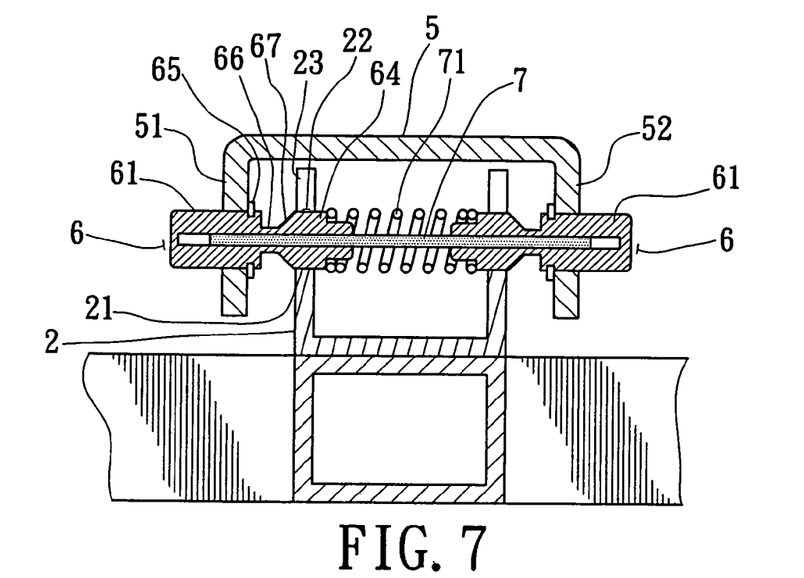
FIG. 7 is a vertical section of the second embodiment.
Figure 8:
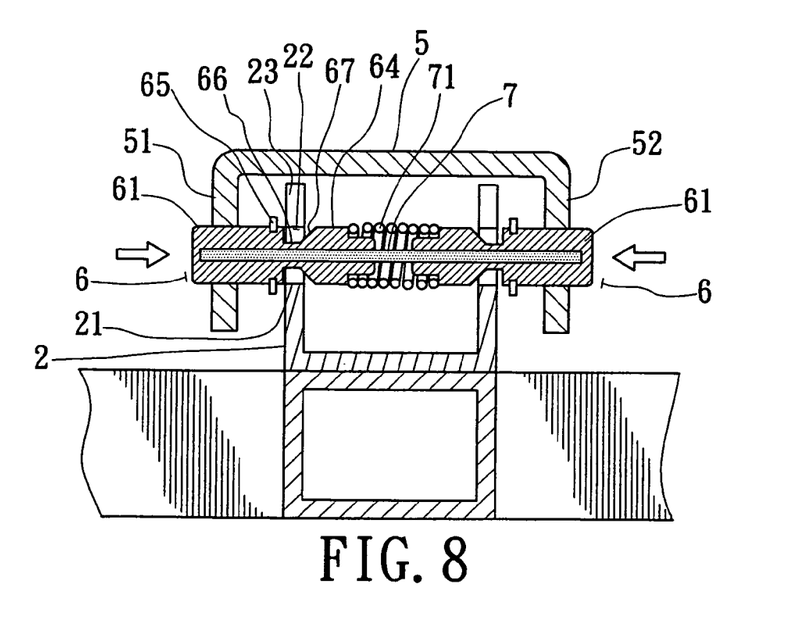
FIG. 8 is a vertical section of the second embodiment with the engaging pins being pressed.

Referring to FIG. 7, in a second embodiment, two engaging pins 6 are fitted to the connecting seat member 5 instead while the locating seat member 2 is formed with two fitting portions for connection with respective ones of the engaging pins 6, each of which fitting portions has a through hole 21, a gap 22, and a slope 23 like the fitting portion of the first embodiment. The engaging pins 6, 6 are passed through respective ones of the wall portions 51, 52 of the connecting seat member 5 at pressed end portions 61 thereof, and a spring 71 is connected to inner ends of the engaging pins 6, 6 at two ends thereof, and an axial rod 7 is passed through the spring 71, and movably passed into the engaging pins 6, 6 at two ends thereof. Detaining elements 65 are secured around inner ends of the pressed end portions 61 for preventing the pins 6, 6 from falling off. Thus, the engaging pins 6, 6 are biased away from each other by the spring 71. And, during downward movement of the engaging pins 6 together with the seat member 5 in connecting the rear part 12 to the front part 11, the pins 6 will be made to move in such direction as to compress the spring 71 owing to contact of cone-shaped portions 67, 67 thereof with the corresponding slopes 23, 23, and in turns, the engaging pins 6, 6 are passed through the gaps 22, 22 at thin portions 66, 66 thereof, and fitted in and engaged with the through holes 21, 21 at stopped portions 64, 64 thereof, as shown in FIG. 7. Consequently, the engaging pins 6, 6 will engage respective ones of the fitting portions of the locating seat member 2 after the connecting seat member 5 is fitted over the locating seat member 2. And, when the engaging pins 6, 6 are pressed at the pressed end portions 61, 61 thereof at the same time as shown in FIG. 8, the thin portions 66, 66 will be passed into the through holes 21, 21, and the engaging pins 6, 6 can be disengaged from the locating seat member 2; thus, the rear part 12 can be separated from the front part 11.

Figure 1:
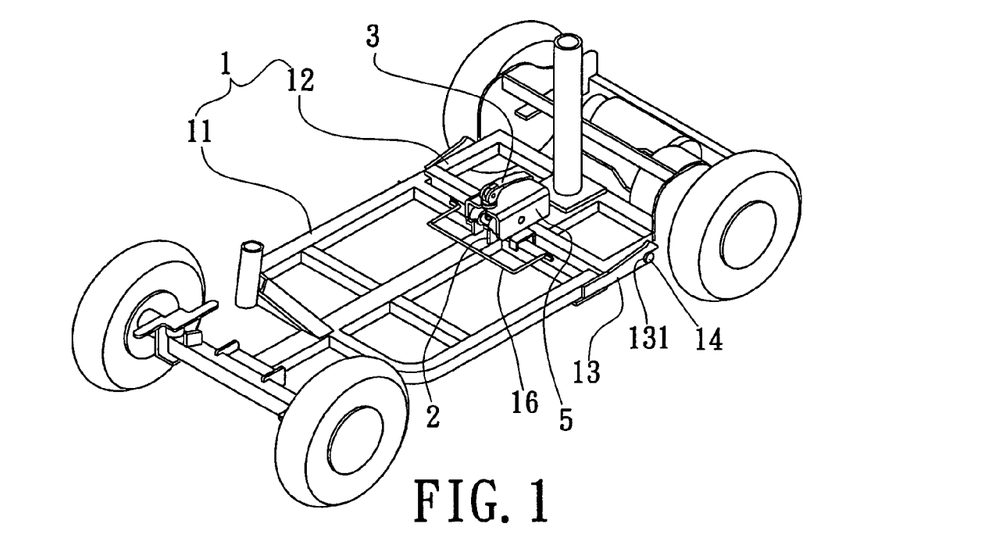
FIG. 1 is a perspective view of the frame of an electric cart according to the present invention.
Figure 2:
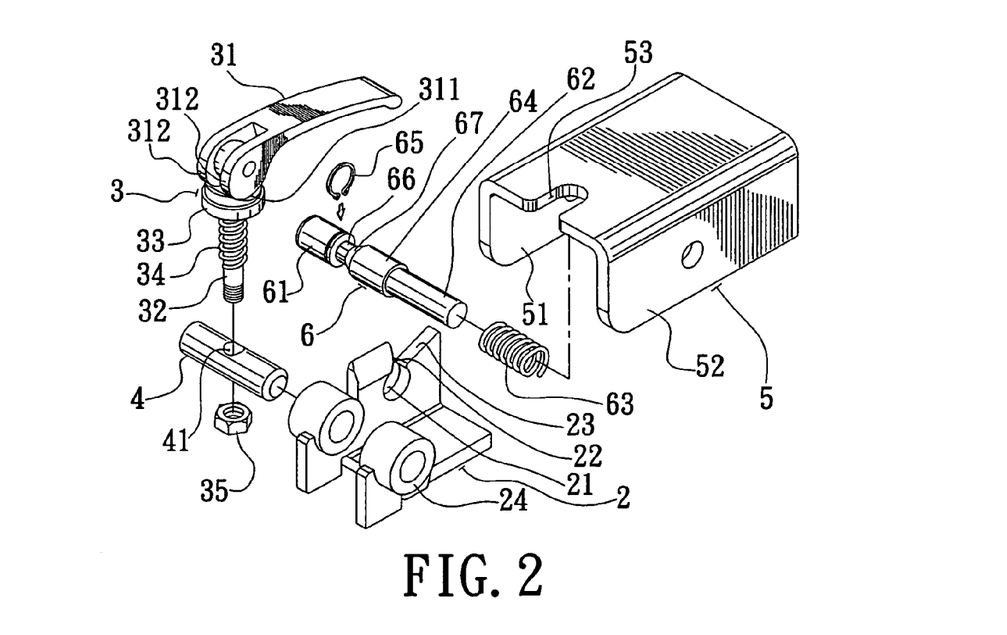
FIG. 2 is an exploded perspective view of the connecting structure of the cart frame of the present invention.
Figure 9:
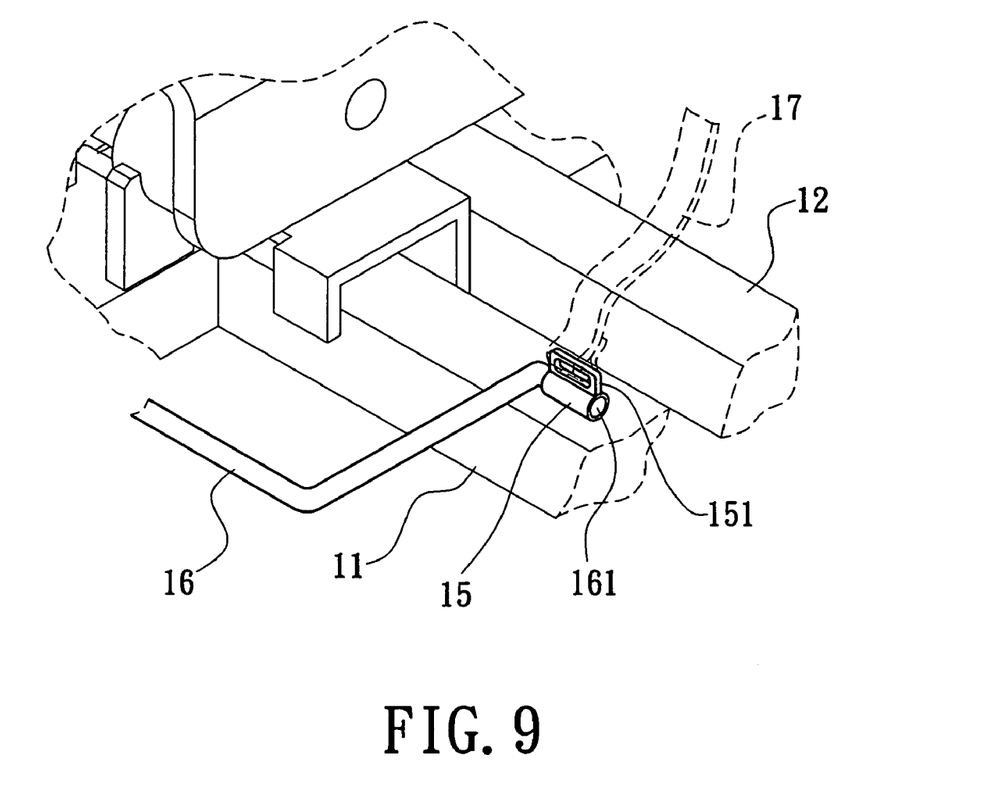
FIG. 9 is a partial perspective view of the front part of the cart frame of the present invention.

Referring to FIGS. 1 and 9, the front part 11 of the frame further has two fitting tubes 15 secured thereto, and a lifting handle 16 is detachably connected and pivoted to the front part 11 by means of inserting two fitting end portions 161 of the lifting handle 16 into respective ones of the fitting tubes 15; thus, one can lift the front part 11 easily by the handle 16 after the rear part 12 has been separated from the front part 11.

Referring to FIGS. 1 and 9 again, the fitting tubes 15 are further formed with connecting ears 151, and a strap 17 is connected to the connecting ears 151 at two ends thereof, and connected to a cover (not shown) of the cart frame 1 such that the frame cover is fastened to the frame 1.

From the above description, it can be easily understood that the present invention has advantages as followings:

1. The connecting seat member 5 can be easily fitted to the locating seat member 2 therefore the rear part 12 can be rapidly joined to the front part 11.
2. Connection of the connecting seat member 5 with the locating seat member 2 can be secured with the help of the fastening member 3.
3. The rear part 12 can be lifted at the front end for separating the connecting seat member 5 from the locating seat member 2 after the engaging pin 6 is pressed. Therefore, the rear part 12 can be easily separated from the front part 11.
4. Because of the lifting handle 16 joined to the front part 11, a person can lift the front part 11 easily after the rear part 12 has been separated from the front part 11.

What is claimed is:

1. A frame of an electric cart for a person to ride on, comprising
    a front part;
    a rear part detachably connected to the front part;
    a locating seat member secured on a rear end of the front part; the locating seat member having a fitting portion, which is formed with a through hole, a gap above and communicating with the through hole, and a slope adjacent to the gap;
    a connecting seat member secured on a front end of the rear part for engaging the locating seat member to join the rear part to the front part; the connecting seat member having first and second lateral wall portions opposing each other;
    a first engaging pin passed through the lateral wall portions of the connecting seat member; the engaging pin having:

(1) a pressed end portion at a first end thereof, which is passed through the first lateral wall portion;
(2) a thin portion next to the pressed end portion; the thin portion being narrower than the gap of the fitting portion of the locating seat member;
(3) a cone-shaped portion next to the thin portion; and
(4) a stopped portion next to the cone-shaped portion; the stopped portion being wider than the gap, and narrower than the through hole of the locating seat member; and a spring connected to the engaging pin for biasing the pressed end portion of the pin further away from the second wall portion;

the engaging pin being able to be pressed against the slope of the locating seat member at the cone-shaped portion thereof while the connecting seat member is being fitted onto the locating member such that the pin will be made to move in such direction as to compress the spring, and such that the pin will be passed through the gap and into the through hole of the locating seat member from the thin portion thereof, allowing the stopped portion of the pin to be through the through hole to engage the locating seat member for securing the connecting seat member to the locating seat member.

2. The frame of an electric cart as claimed in claim 1, wherein the pressed end portion of the engaging pin has a detaining element secured around it for preventing the pin from falling off from the first wall portion, and the engaging pin has an insertion portion at a second end, which is in an opposite direction of the first end; the insertion portion being passed through the spring and the second wall portion in sequence such that the spring contacts the second wall portion and the stopped portion respectively at two ends thereof.

3. The frame of an electric cart as claimed in claim 1, wherein instead of the first engaging pin, two pins, which are like the first engaging pin, are passed through respective ones of the lateral wall portions of the connecting seat member with a spring being arranged between inner ends thereof, and an axial rod is movably passed into the spring and the inner ends of the pins at two ends, and pressed end portions of both of the pins have detaining elements secured around them for preventing the pins from falling off the connecting seat member.

4. The frame of an electric cart as claimed in claim 1, wherein the locating seat member has two spaced co-axial tube portions, and a pivotal rod formed with a radial through hole is turnably passed into the co-axial tube portions with the radial hole being between the co-axial tube portions while the connecting seat member has a receiving gap thereon; a fastening member being fitted to the pivotal rod for further fastening the connecting seat member to the locating seat member; the fastening member including:

(1) a pressing block for contact with the connecting seat member;
(2) a rod-shaped portion formed with screw threads on a lower end thereof; the rod-shaped portion being passed through the pressing block, a second spring, and the radial through hole of the pivotal rod in sequence from a lower end, and connected to a nut at the threaded lower end thereof; and
(3) a lever formed with both a pushing portion and a loosening portion at a front end thereof; the lever being pivoted to an upper end of the rod-shaped portion at the front end thereof;

the rod-shaped portion being capable of being fitted into the receiving gap of the connecting seat member after the rear part is joined to the front part; the pressing block being forced to come into contact with the connecting seat member as soon as the lever is moved to such a position as to contact the pressing block at the pushing portion thereof after the rod-shaped portion has been fitted into the receiving gap, thus further securing the connecting seat member to the locating seat member; the pressing block being biased upwards and away from the connecting seat member by the second spring for allowing the rod-shaped portion to move out of the receiving gap as soon as the lever is moved to such a position as to contact the pressing block at the loosening portion thereof.

5. The frame of an electric cart as claimed in claimed 1, wherein the front part has a lifting handle pivoted thereto for allowing a person to lift the front part thereby.

* * * * *